United States Patent
Walker

(10) Patent No.: US 11,035,253 B2
(45) Date of Patent: Jun. 15, 2021

(54) FACE SEAL WITH DAMPER

(71) Applicant: UNITED TECHNOLOGIES CORPORATION, Farmington, CT (US)

(72) Inventor: Brady Walker, Glastonbury, CT (US)

(73) Assignee: Raytheon Technologies Corporation, Farmington, CT (US)

(*) Notice: Subject to any disclaimer, the term of this patent is extended or adjusted under 35 U.S.C. 154(b) by 99 days.

(21) Appl. No.: 16/267,584

(22) Filed: Feb. 5, 2019

(65) Prior Publication Data

US 2020/0248588 A1 Aug. 6, 2020

(51) Int. Cl.
| | | |
|---|---|---|
| F01D 25/16 | (2006.01) | |
| F01D 25/18 | (2006.01) | |
| F01D 11/00 | (2006.01) | |
| F02C 7/06 | (2006.01) | |
| F01D 5/22 | (2006.01) | |
| F01D 9/04 | (2006.01) | |

(52) U.S. Cl.
CPC .......... *F01D 25/183* (2013.01); *F01D 11/005* (2013.01); *F01D 25/162* (2013.01); *F02C 7/06* (2013.01); *F01D 5/22* (2013.01); *F01D 9/041* (2013.01); *F05D 2220/32* (2013.01)

(58) Field of Classification Search
None
See application file for complete search history.

(56) References Cited

U.S. PATENT DOCUMENTS

| | | | |
|---|---|---|---|
| 3,372,939 A | 3/1968 | Coulombe et al. | |
| 3,759,533 A | 9/1973 | Neely | |
| 3,776,560 A * | 12/1973 | Wentworth, Jr. | ...... F16J 15/363 277/387 |
| 3,915,521 A | 10/1975 | Young | |
| 4,026,564 A | 5/1977 | Metcalfe | |
| 4,087,100 A | 5/1978 | Yoshihashi et al. | |
| 4,142,731 A | 3/1979 | Filippov et al. | |
| 4,192,633 A * | 3/1980 | Herzner | ...... F01D 5/10 415/119 |
| 4,406,459 A | 9/1983 | Davis | |
| 4,407,512 A | 10/1983 | Trytek | |
| 4,453,722 A * | 6/1984 | Swanson | ...... F16J 15/008 277/372 |

(Continued)

FOREIGN PATENT DOCUMENTS

| | | |
|---|---|---|
| EP | 2740975 A1 | 6/2014 |
| EP | 3009612 A1 | 4/2016 |

(Continued)

OTHER PUBLICATIONS

European Search Report for EP Application No. 20155676.8 dated Jun. 15, 2020.

*Primary Examiner* — Michael Lebentritt
(74) *Attorney, Agent, or Firm* — Carlson, Gaskey & Olds, P.C.

(57) ABSTRACT

A gas turbine engine component includes a static component, a seal body associated with the static component, the seal body having an end surface configured to face a rotating seal seat, and a damper positioned radially outward of the seal body. The damper includes a contact that engages the seal body to dampen radial movement of the seal body while accommodating axial movement of the seal body.

20 Claims, 2 Drawing Sheets

(56) References Cited

U.S. PATENT DOCUMENTS

| | | | | |
|---|---|---|---|---|
| 4,477,088 A * | 10/1984 | Picard | ............... | F16J 15/008 277/379 |
| 4,527,910 A * | 7/1985 | Fleming | ............... | F01D 25/164 384/101 |
| 5,088,890 A | 2/1992 | Jewess | | |
| 5,211,536 A * | 5/1993 | Ackerman | ............... | F01D 9/042 415/177 |
| 5,236,186 A * | 8/1993 | Weltin | ............... | F16F 7/108 188/267 |
| 5,263,312 A * | 11/1993 | Walker | ............... | F02C 7/25 285/13 |
| 5,415,526 A * | 5/1995 | Mercadante | ............... | F01D 5/081 416/190 |
| 5,464,227 A | 11/1995 | Olson | | |
| 5,490,679 A | 2/1996 | Borrino et al. | | |
| 5,501,471 A | 3/1996 | Ohba et al. | | |
| 6,131,914 A | 10/2000 | Proveaux | | |
| 6,676,369 B2 | 1/2004 | Brauer | | |
| 6,758,477 B2 | 7/2004 | Brauer | | |
| 7,225,626 B2 | 6/2007 | Robinson | | |
| 7,837,199 B2 * | 11/2010 | Craig | ............... | F01D 11/003 277/370 |
| 7,946,590 B2 | 5/2011 | Dobek et al. | | |
| 9,879,780 B2 | 1/2018 | Rogers et al. | | |
| 2003/0011135 A1 * | 1/2003 | Meacham | ............... | F16J 15/3404 277/408 |
| 2005/0035554 A1 * | 2/2005 | Roberts | ............... | F16J 15/3476 277/358 |
| 2005/0206088 A1 | 9/2005 | Anderson | | |
| 2007/0025835 A1 | 2/2007 | Gockel | | |
| 2007/0108704 A1 * | 5/2007 | Craig | ............... | F16J 15/3468 277/370 |
| 2007/0259194 A1 * | 11/2007 | Freling | ............... | C23C 4/06 428/469 |
| 2009/0121441 A1 * | 5/2009 | Miller | ............... | F01D 11/003 277/366 |
| 2013/0180350 A1 * | 7/2013 | Kraus | ............... | F16H 21/44 74/108 |
| 2014/0159317 A1 * | 6/2014 | Jahn | ............... | F16J 15/3476 277/411 |
| 2015/0184531 A1 | 7/2015 | Baptista | | |
| 2016/0010477 A1 * | 1/2016 | Maret | ............... | F16J 15/3404 277/408 |
| 2016/0108750 A1 | 4/2016 | Wilson et al. | | |
| 2017/0051834 A1 * | 2/2017 | Webster | ............... | F16J 15/447 |
| 2017/0101879 A1 * | 4/2017 | Wotzak | ............... | F01D 5/026 |
| 2018/0016939 A1 * | 1/2018 | Klaus | ............... | F02K 3/04 |
| 2018/0283193 A1 * | 10/2018 | Walker | ............... | F16J 15/0806 |
| 2018/0306241 A1 * | 10/2018 | Ciciriello | ............... | F16C 33/467 |
| 2019/0063247 A1 * | 2/2019 | Walker | ............... | F16J 15/453 |
| 2019/0078688 A1 * | 3/2019 | Walker | ............... | F01D 11/003 |
| 2019/0249559 A1 * | 8/2019 | Sonokawa | ............... | F01D 11/003 |

FOREIGN PATENT DOCUMENTS

| | | |
|---|---|---|
| EP | 3012413 A1 | 4/2016 |
| GB | 2285101 | 6/1995 |

\* cited by examiner

FACE SEAL WITH DAMPER

BACKGROUND

This application relates to a gas turbine engine that includes a component comprising a face seal with a damper.

Gas turbine engines are known and typically include a fan delivering air into a bypass duct as bypass air and into a compressor as core air. The air is compressed and delivered into a combustor section where it is mixed with fuel and ignited. Products of the combustion pass downstream over turbine rotors, driving them to rotate.

In one known type of gas turbine engine, there are at least two turbine rotors, each driving a compressor rotor. One of the two rotors rotates at higher speeds relative to a lower speed rotor. In one example, a seal for an engine bearing compartment is installed within a stationary seal carrier. The seal has an end face that contacts a rotating seal face plate or seat. The face plate is mounted for rotation with a rotor shaft that connects a turbine rotor to a compressor rotor.

The seal should be able to accommodate axial and radial movement, however, excessive movement can be potentially damaging. For example, the seal has a vibratory mode that results in a lower frequency precession, which can cause damage to the seal as a result of an impact between the stationary seal and the rotating seat. It has been proposed to control movement using an air or oil film damper but these systems can be overly complicated and expensive.

SUMMARY

In a featured embodiment, a gas turbine engine component includes a static component, a seal body associated with the static component, the seal body having an end surface configured to face a rotating seal seat, and a damper positioned radially outward of the seal body. The damper includes a contact that engages the seal body to dampen radial movement of the seal body while accommodating axial movement of the seal body.

In another embodiment according to the previous embodiment, the static component comprises a seal housing fixed to a non-rotating engine structure.

In another embodiment according to any of the previous embodiments, the component includes at least one spring acting between the seal housing and the seal body to accommodate axial movement of the seal body relative to the rotating seal seat.

In another embodiment according to any of the previous embodiments, the component includes a seal carrier fixed to the seal body.

In another embodiment according to any of the previous embodiments, the at least one spring has a first spring end fixed to the seal housing and a second spring end fixed to the seal carrier.

In another embodiment according to any of the previous embodiments, the damper comprises at least one finger extending from the seal housing in an axial direction to a distal end that extends in a radial inward direction toward the seal carrier.

In another embodiment according to any of the previous embodiments, the at least one finger comprises a plurality of fingers.

In another embodiment according to any of the previous embodiments, the at least one finger includes a narrowing neck portion to adjust radial stiffness.

In another embodiment according to any of the previous embodiments, the distal end includes the contact that directly engages a radially outer surface of the seal carrier.

In another embodiment according to any of the previous embodiments, the contact comprises at least one bearing ball that maintains radial contact with the seal carrier while allowing axial movement of the seal carrier relative to the seal housing and seal seat.

In another embodiment according to any of the previous embodiments, the seal body comprises a carbon face seal.

In another featured embodiment, a gas turbine engine includes at least one rotor shaft that interconnects a compressor and a turbine for rotation about an engine center axis, and a carbon face seal assembly. The seal assembly includes a seal housing fixed to a non-rotating engine structure, a seal seat mounted for rotation with the at least one rotor shaft, a seal body positioned axially between the seal housing and the seal seat, and a damper positioned radially outward of the seal body. The damper includes a contact that engages the seal body to dampen radial movement of the seal body while accommodating axial movement of the seal body.

In another embodiment according to any of the previous embodiments, the damper comprises at least one finger extending from the seal housing in an axial direction to a distal end that extends in a radial inward direction toward the seal body.

In another embodiment according to any of the previous embodiments, the distal end includes the contact, which comprises at least one bearing ball that maintains radial contact with the seal body while allowing axial movement of the seal body relative to the seal housing and seal seat.

In another embodiment according to any of the previous embodiments, the seal body includes a first end face, a second end face axially spaced from the first end face, and radially inner and radially outer surfaces that extend between the first and the second end faces, and including a seal carrier fixed to the seal body at least at the radially outer surface, and wherein the distal end of the at least one finger extends in a radial inward direction to directly engage a radially outer surface of the seal carrier.

In another embodiment according to any of the previous embodiments, the engine further includes at least one spring acting between the seal housing and the seal body to accommodate axial movement of the seal body relative to the seal seat, and wherein the at least one spring has a first spring end fixed to the seal housing and a second spring end fixed to the seal carrier.

In another embodiment according to any of the previous embodiments, the at least one finger includes a narrowing neck portion to adjust radial stiffness.

In another featured embodiment, a method of operating a gas turbine includes the steps of driving at least one shaft with a turbine rotor to drive a compressor; holding a seal body in a non-rotating relationship relative to a rotating seal seat coupled to the at least one shaft; and damping radial movement of the seal body with a damper positioned radially outward of the seal body while accommodating axial movement of the seal body relative to the rotating seal seat.

In another embodiment according to any of the previous embodiments, the damper comprises at least one finger that extends to a distal end that maintains contact with a radially outer surface of the seal body for radialy damping while allowing axial movement of the seal body relative to the rotating seal seat.

In another embodiment according to any of the previous embodiments, the method includes providing a seal carrier fixed to the seal body and providing the distal end with at least one bearing ball, and further includes connecting a first spring end of at least one spring to a non-rotating engine structure, connecting a second spring end of the at least one spring to the seal carrier such that the at least one spring accommodates axial movement of the seal body relative to the rotating seal seat, and extending the distal end of the at least one finger in a radial inward direction to directly engage a radially outer surface of the seal carrier to dampen radial movement of the seal body.

These and other features may be best understood from the following drawings and specification.

DETAILED DESCRIPTION

Figure 1:
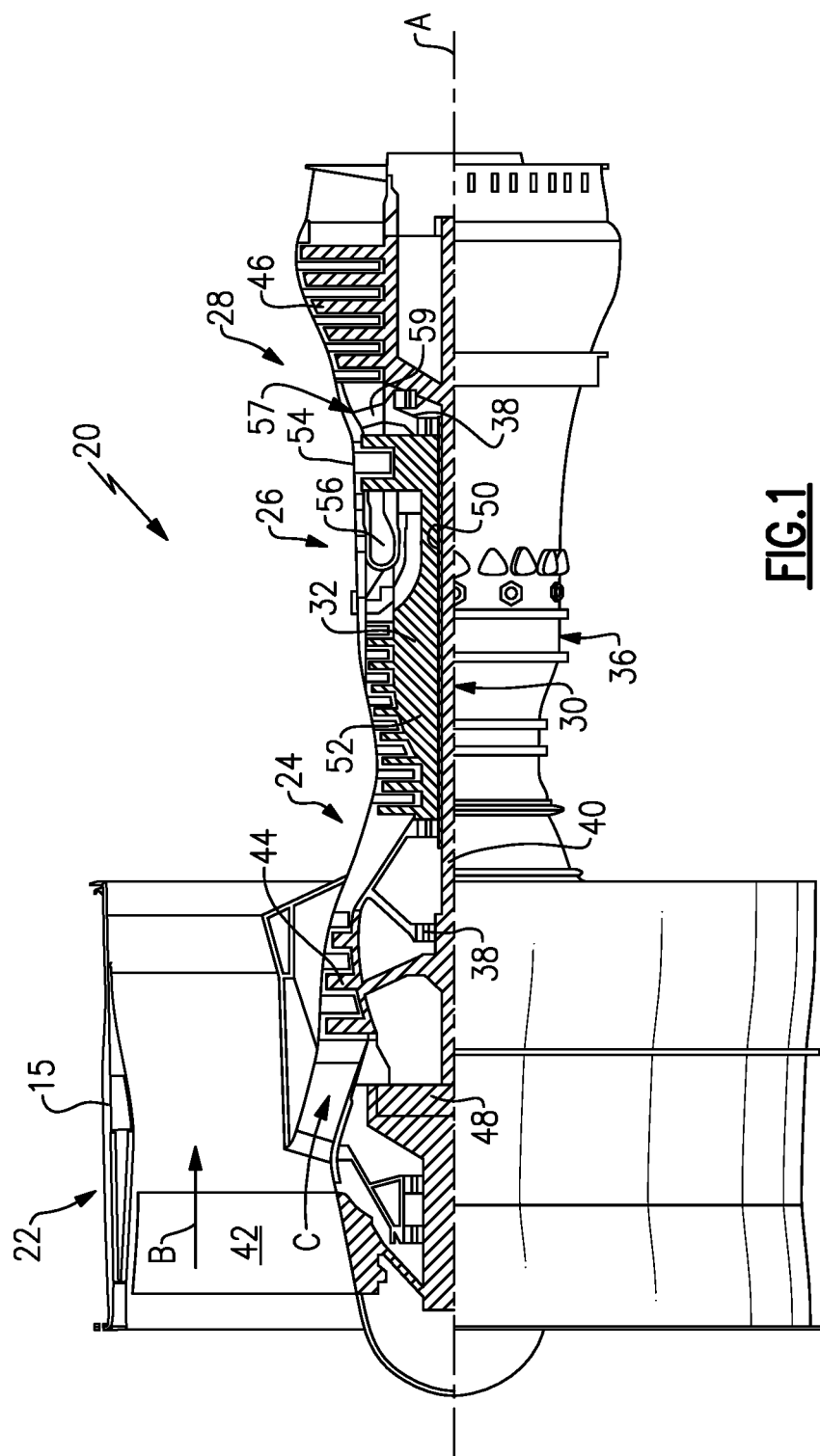
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a first (or low) pressure compressor 44 and a first (or low) pressure turbine 46. The inner shaft 40 is connected to a fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
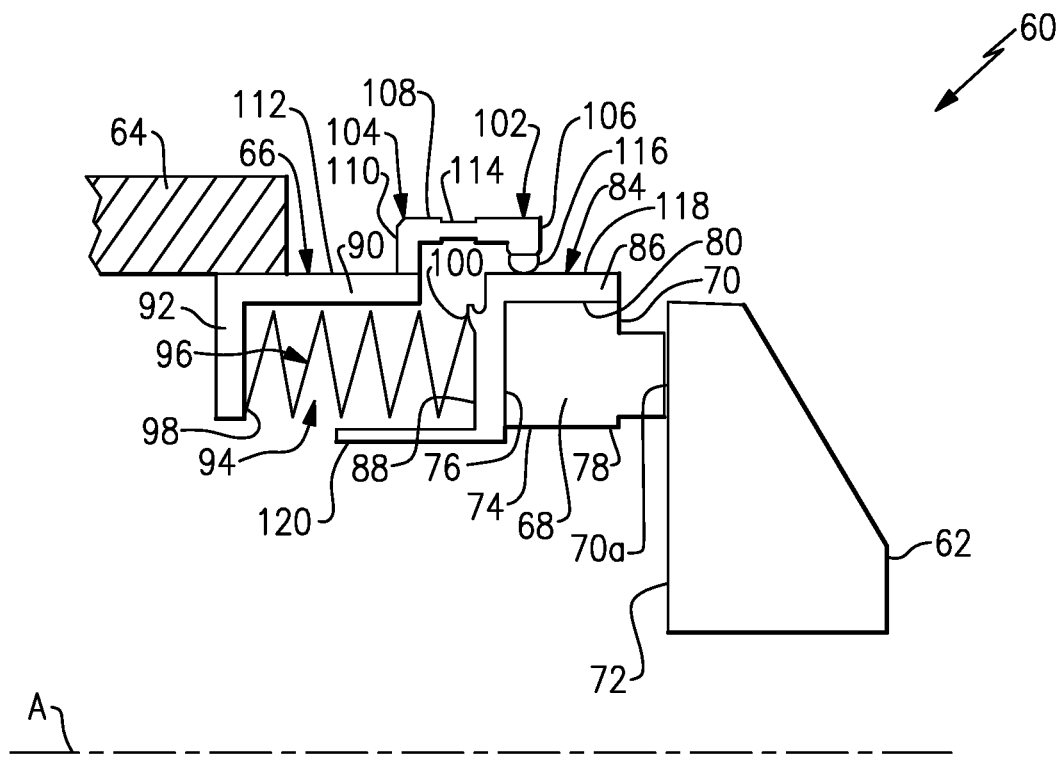
FIG. 2 shows a schematic illustration of a seal assembly as used in the gas turbine engine of FIG. 1.

A face seal assembly 60 is illustrated in FIG. 2. A seal face plate or seal seat 62 is mounted for rotation about an axis A defined by an engine centerline (FIG. 1). The seal seat 62 rotates relative to a non-rotating engine component or structure 64. A seal housing 66 is fixed to the non-rotating structure 64. A seal body 68 is associated with the seal housing 66 and includes a first end surface or face 70 that faces an end surface or face 72 of the seal seat 62. The seal body 68 has a central bore 74 that surrounds the axis A. It should be understood that only the upper cross-section of the seal assembly 60 is shown in FIG. 2, with the lower cross-section being similarly configured to that of the upper cross-section as these components extend around the axis A.

The seal body 68 is made from a carbon-based material as known. The seal body 68 includes the first end face 70, a second end face 76 axially spaced from the first end face 70, and radially inner 78 and radially outer 80 surfaces that extend between the first 70 and the second 76 end faces. The radially inner 78 and radially outer 80 surfaces extend parallel to each other in an axial direction along the axis A. The first 70 and second 76 end faces extend generally perpendicular to the radially inner 78 and radially outer 80 surfaces. The first end face 70 includes a protruding portion or nose 70*a* that extends toward the seal seat 62 to make sealing contact with the end face 72. Thus, there is direct contact between the face 72 of the seal seat 62 and the nose 70*a* of the carbon seal body 68.

A seal carrier 84 is associated with the seal body 68. The seal carrier 84 comprises a carbon carrier for the seal body 68 that is coupled to the seal housing 66 such that the seal carrier 84 and seal body 68 comprise non-rotating components. In one example, the seal carrier 84 includes a radially outer wall 86 that extends in an axial direction and seats the radially outer surface 80 of the seal body 68 and a radially inwardly extending wall 88 that seats the second end face 76 of the seal body 68. The seal carrier 84 also includes a flange 120 that extends in an axial direction opposite from the outer wall 86. The flange 120 is positioned at a radially inward edge of the wall 88.

In one example, the seal housing 66 includes a radially outer wall 90 extending in an axial direction and a radial wall 92 that extends radially inward from the outer wall 90. An open cavity 94 is formed between the outer wall 90 and radial wall 92 of the seal housing 66 and the radial wall 88 and flange 120 of the seal carrier 84. At least one resilient member, such as a spring 96 for example, is received within this cavity 94 and is used to exert a spring force between the seal housing 66 and seal carrier 84. The at least one spring 96 has a first spring end 98 fixed to the seal housing 66 and a second spring end 100 fixed to the seal carrier 84.

The seal assembly 60 includes a damper 102 that includes a contact 116 that engages the seal to dampen radial movement of the seal while accommodating axial movement of the seal. In one example, the damper 102 comprises at least one finger 104 extending from the seal housing 66 in an axial direction to a distal end 106 that extends in a radial inward direction toward the seal carrier 84. The finger 104 has an axially extending elongated body 108 having the distal end 106 at one end and a connecting portion 110 at an opposite end. In one example, the connecting portion 110 extends in a radially inward direction from the elongated body 108 to connect to a radially outer surface 112 of the outer wall 90 of the seal housing 66.

In one example, the elongated body 108 of the finger 104 includes a narrowing neck portion 114 to adjust radial stiffness. The narrowing neck portion 114 comprises a reduced diameter portion compared to diameters at portions of the elongated body 108 at the distal end 106 and/or connecting portion 110. This reduced diameter portion or narrowing neck portion 114 basically comprises a pivoting area that allows the distal end 106 to move up and down in a radial direction to accommodate radial movement of the seal carrier 84 and seal body 68. The distal end 106 is configured such that the finger 104 is always in contact with the seal carrier 84 during engine operation, i.e. there is never a radial gap between the contact 116 at the distal end 106 and the seal carrier 84. As such, the distal end 106 includes the contact 116 that directly engages a radially outer surface 118 of the seal carrier 84.

In one example, the contact 116 comprises at least one bearing ball that maintains radial contact with the seal carrier while simultaneously allowing axial movement of the seal carrier 84 relative to the seal housing 66 and seal seat 62. The bearing ball rotates within the distal end 106 of the finger 104 to accommodate the axial movement. In one example, the bearing ball comprises a full sphere that is installed within a socket formed in the distal end 106 of the finger 104. In one example, the ball is fully retained within the socket with approximately ¼ of the ball protruding to contact the carbon seal carrier 84. The bearing ball is made from a ceramic material such as silicon nitride or other similar materials, for example.

Figure 3:
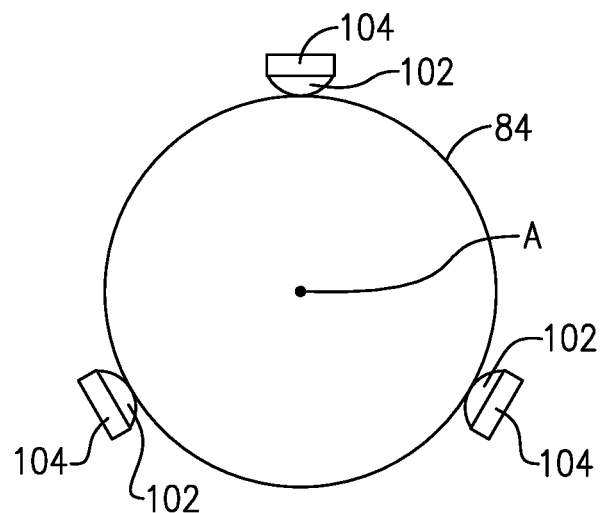
FIG. 3 shows a schematic example of the seal assembly including a plurality of damping contacts.

In one example, the at least one finger 104 comprises a plurality of fingers 104. FIG. 3 shows a configuration where there are three fingers 104 with dampers 102. The fingers 104 are equally spaced apart from each other in a circumferential direction about the axis A.

The subject invention provides one or more fingers that contact the carbon seal carrier in a radial direction via bearing balls. The fingers are attached to the seal housing and are configured to be flexible enough to account for small amounts of radial travel while maintaining contact. The distal end(s) of the finger(s) include the bearing ball(s), which are in direct contact with the carbon seal carrier. This allows axial movement of the seal without creating extra drag. The seal includes a spring and is compressed/elongated during operation so the bearing ball(s) will not impede the natural motion of the seal.

The subject invention provides a mechanical solution that is much simpler and compact as compared to prior air or oil film dampers. Further, the mechanical solution is capable of limiting radial movement of the seal without adversely impacting axial movement of the seal.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine component comprising:
   a static component that comprises a seal housing fixed to a non-rotating engine structure;
   a seal body associated with the static component, the seal body having an end surface configured to face a rotating seal seat that rotates about an engine center axis;
   a seal carrier fixed to the seal body;
   at least one spring acting between the seal housing and the seal body to accommodate axial movement of the seal body relative to the rotating seal seat; and
   a damper positioned radially outward of the seal body, wherein the damper includes a contact that engages the seal body to dampen radial movement of the seal body while accommodating axial movement of the seal body, and wherein the damper comprises at least one finger extending from the seal housing in an axial direction along the engine center axis to a distal end that extends in a radial inward direction toward the seal carrier.

2. The gas turbine engine component as set forth in claim 1, wherein the at least one spring has a first spring end fixed to the seal housing and a second spring end fixed to the seal carrier.

3. The gas turbine engine component as set forth in claim 1, wherein the at least one finger comprises a plurality of fingers.

4. The gas turbine engine component as set forth in claim 1, wherein the at least one finger includes a narrowing neck portion to adjust radial stiffness.

5. The gas turbine engine as set forth in claim 1, wherein the distal end includes the contact that directly engages a radially outer surface of the seal carrier.

6. The gas turbine engine component as set forth in claim 5, wherein the contact comprises at least one bearing ball that maintains radial contact with the seal carrier while allowing axial movement of the seal carrier relative to the seal housing and seal seat.

7. The gas turbine engine component as set forth in claim 1, wherein the seal body comprises a carbon face seal.

8. A gas turbine engine comprising:
  at least one rotor shaft that interconnects a compressor and a turbine for rotation about an engine center axis; and
  a carbon face seal assembly including a seal housing fixed to a non-rotating engine structure, a seal seat mounted for rotation with the at least one rotor shaft, a seal body postioned axially between the seal housing and the seal seat, and a damper positioned radially outward of the seal body, wherein the damper includes a contact that engages the seal body to dampen radial movement of the seal body while accommodating axial movement of the seal body, wherein the damper comprises at least one finger extending from the seal housing in an axial direction along the engine center axis to a distal end that extends in a radial inward direction toward the seal body.

9. The gas turbine engine as set forth in claim 8, wherein the distal end includes the contact which comprises at least one bearing ball that maintains radial contact with the seal body while allowing axial movement of the seal body relative to the seal housing and seal seat.

10. The gas turbine engine as set forth in claim 9, wherein the seal body includes a first end face, a second end face axially spaced from the first end face, and radially inner and radially outer surfaces that extend between the first and the second end faces, and including a seal carrier fixed to the seal body at least at the radially outer surface, and wherein the distal end of the at least one finger extends in a radial inward direction to directly engage a radially outer surface of the seal carrier.

11. The gas turbine engine as set forth in claim 10, including at least one spring acting between the seal housing and the seal body to accommodate axial movement of the seal body relative to the seal seat, and wherein the at least one spring has a first spring end fixed to the seal housing and a second spring end fixed to the seal carrier.

12. The gas turbine engine as set forth in claim 8, wherein the at least one finger includes a narrowing neck portion to adjust radial stiffness.

13. A method of operating a gas turbine comprising the steps of:
  driving at least one shaft with a turbine rotor to drive a compressor;
  holding a seal body in a non-rotating relationship relative to a rotating seal seat coupled to the at least one shaft; and
  damping radial movement of the seal body with a damper positioned radially outward of the seal body while accommodating axial movement of the seal body relative to the rotating seal seat, wherein the damper includes a contact that engages the seal body to dampen radial movement of the seal body while accommodating axial movement of the seal body, and including rotating the contact within the damper to accommodate the axial movement, and pivoting the damper via a pivoting area to allow the damper to move up and down in a radial direction to accommodate the radial movement.

14. The method as set forth in claim 13, wherein the damper comprises at least one finger that extends to a distal end having the contact that maintains contact with a radially outer surface of the seal body for radially damping while allowing axial movement of the seal body relative to the rotating seal seat.

15. The method as set forth in claim 14, including providing a seal carrier fixed to the seal body and providing the distal end with at least one bearing ball comprising the contact, and including
  connecting a first spring end of at least one spring to a non-rotating engine structure,
  connecting a second spring end of the at least one spring to the seal carrier such that the at least one spring accommodates axial movement of the seal body relative to the rotating seal seat, and
  extending the distal end of the at least one finger in a radial inward direction to directly engage a radially outer surface of the seal carrier via the contact to dampen radial movement of the seal body.

16. The gas turbine engine as set forth in claim 8, wherein the contact rotates within the damper to accommodate the axial movement, and wherein the damper includes a pivoting area that allows the damper to move up and down in a radial direction to accommodate the radial movement.

17. The gas turbine engine as set forth in claim 16, wherein the contact comprises a bearing ball.

18. A gas turbine engine component comprising:
  a static component;
  a seal body associated with the static component, the seal body having an end surface configured to face a rotating seal seat; and
  a damper positioned radially outward of the seal body, wherein the damper includes a contact that engages the seal body to dampen radial movement of the seal body while accommodating axial movement of the seal body, wherein the contact rotates within the damper to accommodate the axial movement, and wherein the damper includes a pivoting area that allows the damper to move up and down in a radial direction to accommodate the radial movement.

19. The gas turbine engine component as set forth in claim 18, wherein the contact comprises a bearing ball.

20. The gas turbine engine component as set forth in claim 1, wherein the contact is made from a ceramic material.

* * * * *